No. 802,519. PATENTED OCT. 24, 1905.
R. D. LONG.
CAR SEAT.
APPLICATION FILED JAN. 26, 1905.
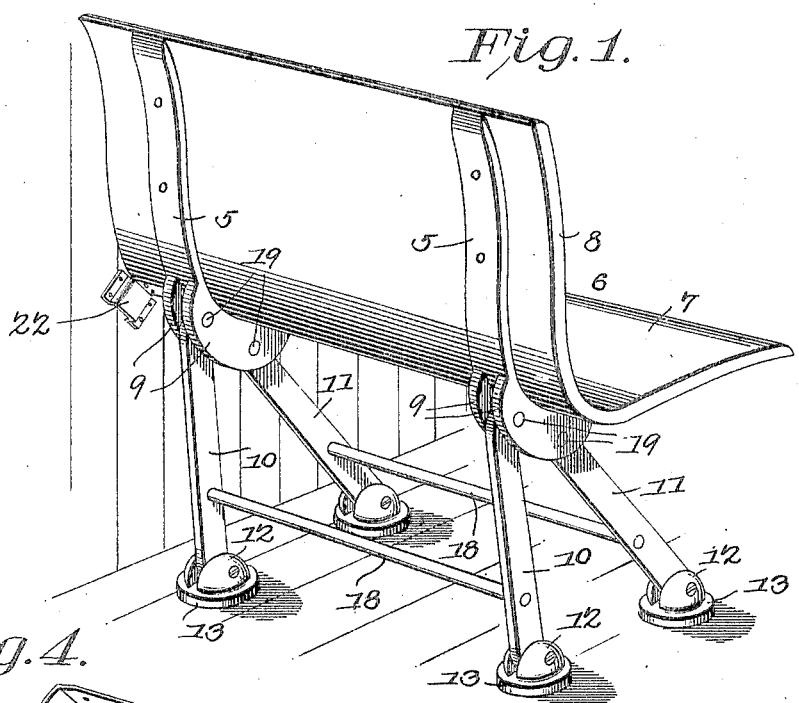
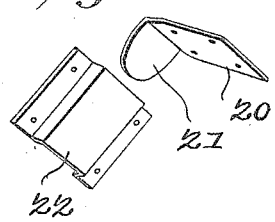
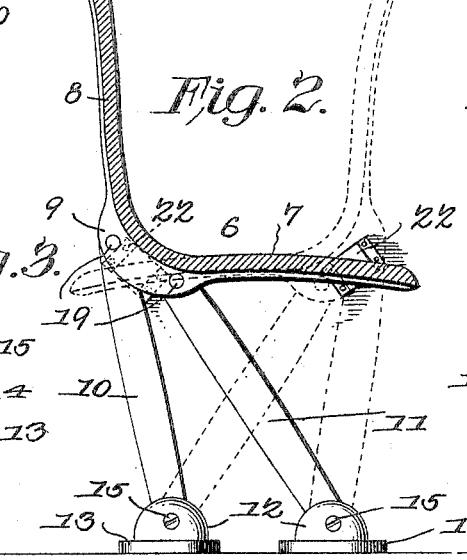
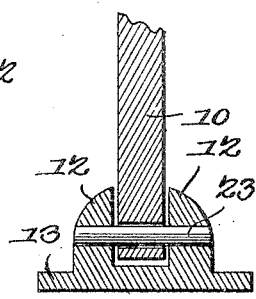
Witnesses
E. H. Stewart
T. N. Acker
Richard D. Long, Inventor
by C. A. Snow & Co.
Attorneys

UNITED STATES PATENT OFFICE.

RICHARD D. LONG, OF IOLA, KANSAS.

CAR-SEAT.

No. 802,519.      Specification of Letters Patent.      Patented Oct. 24, 1905.

Application filed January 26, 1905. Serial No. 242,754.

*To all whom it may concern:*

Be it known that I, RICHARD D. LONG, a citizen of the United States, residing at Iola, in the county of Allen and State of Kansas, have invented a new and useful Car-Seat, of which the following is a specification.

This invention relates to reversible seats for railway-cars, street-cars, and other vehicles, and has for its object to provide a simple, inexpensive, and efficient seat of this character capable of being readily reversed, so as to permit the passengers to face the front of the car regardless of the direction of travel of the latter.

A further object of the invention is to provide means for limiting the tilting movement of the seat, so that the latter will always be maintained in a substantially horizontal position with respect to the floor of the car.

With these and other objects in view the invention consists in the construction and novel combination and arrangement of parts hereinafter fully described, illustrated in the accompanying drawings, and pointed out in the claims hereto appended, it being understood that various changes in form, proportions, and minor details of construction may be resorted to without departing from the principle or sacrificing any of the advantages of this invention.

In the accompanying drawings, forming a part of this specification, Figure 1 is a perspective view of a reversible seat constructed in accordance with my invention. Fig. 2 is a transverse sectional view showing in dotted lines the seat in reversed position. Fig. 3 is a transverse sectional view of one of the supporting-feet. Fig. 4 is a detail perspective view of the locking-lug and one of the keepers detached. Fig. 5 is a transverse sectional view illustrating a modified form of supporting-foot.

Similar numerals of reference indicate corresponding parts in all the figures of the drawings.

The device consists of a pair of spaced substantially L-shaped brackets or arms 5, to which is riveted or otherwise rigidly secured the body portion 6, the latter comprising a seat portion 7 and a back 8, preferably formed integral with the seat portion, as shown. The brackets or arms 5 are cast or otherwise formed with spaced lugs or ears 9, and pivoted between said ears or lugs, at each end of the body portion, is a pair of levers 10 and 11, the opposite ends of which are pivoted between the upwardly-extending ears 12 of supporting-feet 13. The feet 13 are rigidly secured to the floor or platform of the car and are provided with alined openings 14 for the reception of set-screws 15, the ends of which are pointed, as indicated at 16, and engage corresponding sockets 17 in the ends of the levers 10 and 11, so as to form cone-bearings and permit the seat to be readily detached without the necessity of first removing said feet. The levers 10 and 11 of each pair are connected by a longitudinal brace or rod 18, and the upper pivotal points 19 of said levers are disposed closer together than their lower pivotal points, so that when the body portion is moved or tilted backward or forward the latter will make a quarter-turn, which causes the relative positions of the back and seat to be reversed, as clearly shown by dotted lines in Fig. 2 of the drawings.

As a means for limiting the tilting movement of the body portion and retaining the seat proper of the latter in a substantially horizontal position with respect to the floor of the car I rivet or otherwise rigidly secure to one end of said body portion a plate 20, provided with a depending locking-lug 21. The lug 21 is disposed at the juncture of the back and seat, as shown, and is adapted to enter or engage retaining-clips 22, secured to the side of the car, so that when the body portion is tilted in either direction and the seat assumes a horizontal position the lug, by engagement with the adjacent clip, will prevent any further movement of said body portion. It will here be noted that the retaining-clips 22 are secured to the side of the car on each side of the vertical axis of the car-seat and arranged at an angle or inclination with respect thereto to thereby facilitate the introduction of the locking-lug.

In Fig. 5 there is illustrated a modified form of supporting-foot, in which the adjusting-screws are dispensed with and a pin 23 is substituted.

While the seat is illustrated as a car-seat and is described as such, it is obvious that the same may be used in school-houses, churches, parks, private dwellings, or other places where a reversible seat of this character is found desirable.

Having thus described the invention, what is claimed is—

1. The combination with a support, of a body portion comprising a pair of members the positions of which are reversible to form either a back or seat, a retaining-clip secured to the support, and a locking-lug disposed at the juncture of said members and adapted to engage said clip.

2. The combination with a support, of a body portion comprising a pair of members the positions of which are reversible to form either a back or seat, a pair of retaining-clips secured to the support and disposed one on each side of the vertical axis of the body portion, and a locking-lug disposed at the juncture of said members and adapted to engage the clips.

3. The combination with a support, of a body portion comprising a pair of members the positions of which are reversible to form either a back or seat, a pair of retaining-clips secured to the support and disposed one on each side of the vertical axis of the body portion, and a plate secured to one end of the body portion at the juncture of said members and provided with a depending lug adapted to engage the retaining-clips, said clips being disposed at an angle to the vertical axis of the body portion.

4. The combination with a support, of a body portion comprising a pair of members the positions of which are reversible to form either a back or seat, a plurality of supporting-feet provided with spaced perforated lugs, levers pivoted to the body portion and engaging the lugs of said feet, screws engaging the perforations in the lugs and provided with conical bearings forming pivotal connections between the adjacent end of said levers and the supporting-feet, and a locking means disposed at the juncture of said members for engagement with the support.

5. The combination with a support, of a body portion comprising a pair of angularly-disposed members the positions of which are reversible to form either a back or seat, brackets provided with spaced depending lugs secured to the body portion, levers pivoted between the depending lugs of the brackets, supporting-feet pivoted to the opposite ends of the levers, and a locking means disposed at the juncture of said members for engagement with the support.

In testimony that I claim the foregoing as my own I have hereto affixed my signature in the presence of two witnesses.

RICHARD D. LONG.

Witnesses:
 FRANK E. SMITH,
 OTTO S. HEBERLING.